Nov. 13, 1928.

C. GABEL 1,691,802

WADDING DEVICE FOR THE CARTRIDGES OF FOWLING PIECES

Filed Dec. 23, 1926

Inventor
Charles Gabel,
By
Atty.

Patented Nov. 13, 1928.

1,691,802

UNITED STATES PATENT OFFICE.

CHARLES GABEL, OF PARIS, FRANCE, ASSIGNOR TO SOCIÉTÉ ANONYME: CARTOUCHERIE FRANCAISE, OF PARIS, FRANCE.

WADDING DEVICE FOR THE CARTRIDGES OF FOWLING PIECES.

Application filed December 23, 1926, Serial No. 156,643, and in Belgium January 13, 1926.

The present invention relates to wadding devices for use in the cartridges of fowling pieces.

The said device consists of a light and elastic substance disposed within a compressible casing, the whole being coated with a lubricating substance.

The following description with reference to the appended drawings, which are given by way of example, shows various embodiments of the invention.

Figure 1:
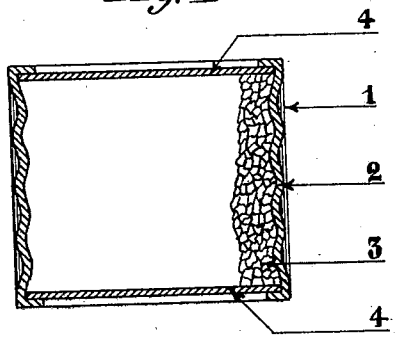
Figure 2:
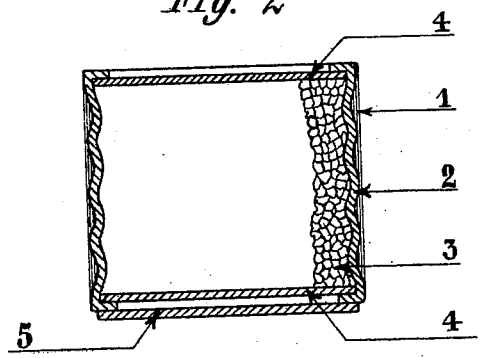
Figure 3:
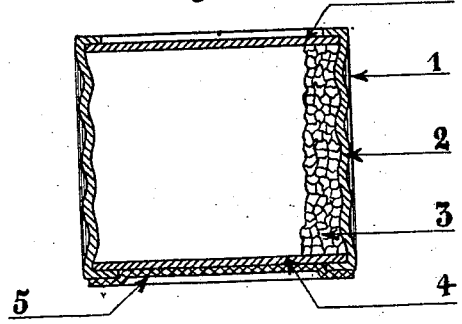

Figs. 1, 2 and 3 show various constructional forms of the wadding device in accordance with the invention.

As observed in Fig. 1, the cylindrical casing 2 is formed of any suitable material, such as paper, thin sheet metal, plastic material or the like, and has a smooth or a corrugated surface to facilitate its compression on the axis of the cylinder.

The said casing may have any suitable length, and it contains the plastic material 3, such as cork in powder or in pieces, optionally agglomerated by means of a substance of a fatty or a resinous nature, a glue or cement, or the material may consist of spongy india rubber.

Due to the small amount of the binding material employed, the elasticity may be maintained even at very low temperatures.

The ends of the said casing consist of the discs 4 of cardboard, cork or felt, or may be formed by overturning a portion of the cylindrical tube, or in any other suitable manner. The casing thus prepared is coated with a lubricant 1, whose diameter corresponds to that of the cartridge shells, and which may consist of grease, vegetable or mineral wax, or a mixture of these bodies, or of paraffin wax.

The composition of the wadding consisting of substances in the state of fragments, forms one of the features of the invention, irrespectively of the nature of the material thus employed.

Modifications may be provided by placing upon the wadding substance itself (Figs. 2 and 3), the pasteboard disc 5, which is usually placed upon the powder.

The aforesaid wadding devices offer marked advantages over the devices in current use, due to the following features:—

1. The wadding is compressible, so that upon igniting the powder, the pressure of the gas in the cartridge will be slightly reduced. Due to the compression of the elastic filling, the diameter of the wadding device will be somewhat increased, whereby the gun barrel will be effectively stopped by the wadding. By the use of the corrugated form for the walls of the device, this stopping can be obtained without any excessive pressure.

2. The device has a very light weight, since the elastic filling usually consists of cork in fragments which are either loose or are but slightly agglomerated, and are protected by the casing against all danger of breakage during transport and handling. Tests made with the aforesaid wadding devices have sufficiently proved the superiority and the regularity of the results which may be obtained by its use in firing, as to velocity, force and concentration of the shot.

What I claim is:

1. A wadding device for the cartridges of fowling pieces, comprising a corrugated casing and elastic material in the state of fragments which is disposed within the said casing, and a sheath of lubricating material surrounding the said corrugated casing whereby it is given a cylindrical form.

2. A wadding device for the cartridges of fowling pieces, comprising a cylindrical casing with corrugated walls, fragments of cork disposed therein, discs closing the top and bottom of said casing, and a sheath of lubricating material surrounding the corrugated walls of the casing whereby it is given a cylindrical form.

In testimony that I claim the foregoing as my invention, I have signed my name hereto.

CHARLES GABEL.